US012156546B2

(12) United States Patent
Ruscio et al.

(10) Patent No.: US 12,156,546 B2
(45) Date of Patent: Dec. 3, 2024

(54) AEROSOL-GENERATING DEVICE WITH PUFF DETECTION AND METHOD FOR PUFF DETECTION

(71) Applicant: Philip Morris Products S.A., Neuchatel (CH)

(72) Inventors: Dani Ruscio, Neuchatel (CH); Yannick Butin, Neuchatel (CH)

(73) Assignee: Philip Morris Products S.A., Neuchatel (CH)

(*) Notice: Subject to any disclaimer, the term of this patent is extended or adjusted under 35 U.S.C. 154(b) by 463 days.

(21) Appl. No.: 17/605,372

(22) PCT Filed: Apr. 22, 2020

(86) PCT No.: PCT/EP2020/061149
§ 371 (c)(1),
(2) Date: Oct. 21, 2021

(87) PCT Pub. No.: WO2020/216765
PCT Pub. Date: Oct. 29, 2020

(65) Prior Publication Data
US 2022/0211113 A1      Jul. 7, 2022

(30) Foreign Application Priority Data
Apr. 23, 2019   (EP) .................... 19170474

(51) Int. Cl.
*A24F 40/51*  (2020.01)
*A24F 40/20*  (2020.01)
(Continued)

(52) U.S. Cl.
CPC ............. *A24F 40/51* (2020.01); *A24F 40/20* (2020.01); *A24F 40/40* (2020.01); *G01K 3/10* (2013.01)

(58) Field of Classification Search
CPC ........... A24F 40/51; A24F 40/40; A24F 40/20
See application file for complete search history.

(56) References Cited

U.S. PATENT DOCUMENTS

2004/0149737 A1   8/2004  Sharpe et al.
2004/0149767 A1   8/2004  Sharpe et al.
(Continued)

FOREIGN PATENT DOCUMENTS

CA      3 009 923 A1    8/2017
CN      103720056 A     4/2014
(Continued)

OTHER PUBLICATIONS

Combined Chinese Office Action and Search Report issued Jul. 6, 2023 in Chinese Patent Application No. 202080030537.6 (with unedited computer-generated English Translation), 18 pages.
(Continued)

*Primary Examiner* — Christopher M Rodd
*Assistant Examiner* — Jennifer A Kessie
(74) *Attorney, Agent, or Firm* — Oblon, McClelland, Maier & Neustadt, L.L.P.

(57) ABSTRACT

An electrically heatable aerosol-generating device for heating an aerosol-forming substrate to form an inhalable aerosol when heated is provided, the device including: a receiving cavity to removably receive at least a portion of an aerosol-generating article including the substrate; an electrical heater to heat the substrate when the article is received in the cavity; and a puff detector including a temperature sensor to detect a temperature change of air flow in the cavity indicative of a user taking a puff, the sensor being arranged outside the cavity at a predefined distance to a test spot on an inner surface of the cavity and is further to detect a change of the temperature of the cavity at the test spot that is caused by a change of the temperature of the air flow
(Continued)

passing along the inner surface at a place of the test spot when the user takes the puff.

15 Claims, 4 Drawing Sheets

(51) Int. Cl.
*A24F 40/40* (2020.01)
*G01K 3/10* (2006.01)

(56) References Cited

U.S. PATENT DOCUMENTS

| | | | |
|---|---|---|---|
| 2017/0196273 A1* | 7/2017 | Qiu | ............... A24F 40/44 |
| 2017/0238610 A1 | 8/2017 | Reevell | |
| 2018/0310617 A1* | 11/2018 | Ding | ............... H05B 1/0227 |
| 2018/0333547 A1 | 11/2018 | Freeman et al. | |

FOREIGN PATENT DOCUMENTS

| | | |
|---|---|---|
| CN | 107920601 A | 4/2018 |
| EA | 031091 B1 | 11/2018 |
| EP | 3 387 923 A1 | 10/2018 |
| GB | 2 061 519 A | 5/1981 |
| GB | 2 554 141 A | 3/2018 |
| JP | 2004-212102 A | 7/2004 |
| JP | 2016-525345 A | 8/2016 |
| KR | 10-2018-0070443 A | 6/2018 |
| RU | 2 613 785 C2 | 3/2017 |
| RU | 2 656 195 C2 | 5/2018 |
| RU | 2 665 438 C1 | 8/2018 |
| RU | 2 676 256 C2 | 12/2018 |
| WO | WO 2010/045671 A1 | 4/2010 |
| WO | WO 2010/073122 A1 | 7/2010 |
| WO | WO 2015/082560 A1 | 6/2015 |
| WO | WO 2017/036950 A2 | 3/2017 |
| WO | WO 2017/036955 A2 | 3/2017 |
| WO | WO 2017/137512 A1 | 8/2017 |
| WO | WO 2017/140898 A1 | 8/2017 |
| WO | WO 2018/019786 A1 | 2/2018 |
| WO | WO 2018/020401 A1 | 2/2018 |
| WO | WO 2018/051346 A1 | 3/2018 |
| WO | WO 2018/234792 A1 | 12/2018 |

OTHER PUBLICATIONS

Combined Russian Office Action and Search Report issued Aug. 23, 2023, in corresponding Russian Patent Application No. 2021133908/03(071664) (with English Translation), 13 pages.
Russian Office Action issued Jan. 17, 2024 in Russian Patent Application No. 2021133908/03(071664) (with English translation), 18 pages.
International Search Report and Written Opinion issued on Aug. 10, 2020 in PCT/EP2020/061149 filed Apr. 22, 2020, 14 pages.
International Preliminary Report on Patentability issued on Apr. 1, 2021 in PCT/EP2020/061149 filed Apr. 22, 2020, 8 pages.
Japanese Office Action issued Apr. 23, 2024 in Japanese Patent Application No. 2021-561977 (with unedited computer-generated English Translation), 5 pages.

* cited by examiner

AEROSOL-GENERATING DEVICE WITH PUFF DETECTION AND METHOD FOR PUFF DETECTION

The present invention relates to an electrically heated aerosol-generating device with means for detecting a user's puff. The invention further relates to a method for detecting a user's puff in use of such an aerosol-generating device.

Electrically heated aerosol-generating devices used for generating an inhalable aerosol by electrically heating an aerosol-forming substrate are generally known from prior art. Such devices may comprise a cavity for receiving at least a portion of an aerosol-generating article that includes the aerosol-forming substrate to be heated. The devices further comprise an electrical heater for heating the substrate to be heated when the article is received in the cavity. To keep a user's experience as uniform as possible, the heating temperature of the substrate is to be maintained at a certain level when a user takes a puff. However, the heating temperature may vary during consumption, in particular due to the air flow that is drawn through the system during a user's puff. For this reason, proper puff detecting is important to ensure an accurate control of the heating process. In general, puff detection may be realized by measuring a temperature drop of the air flow through the receiving cavity of the device when a user takes a puff. For this, many devices comprise a temperature sensor within the receiving cavity which is located directly within an air flow passage in order to allow instantaneous puff detection. However, such an arrangement may restrict the air flow through the device. Furthermore, if located within the receiving cavity, the temperature sensor may get damaged, in particular due to mechanical effects during cleansing of the cavity or during insertion or removal of the article into or from the cavity.

Therefore, it would be desirable to have an electrically heated aerosol-generating device and a method for puff detection with the advantages of prior art solutions but without their limitations. In particular, it would be desirable to have an electrically heated aerosol-generating device and a method for puff detection which provide improved puff detection based on temperature measurements.

According to the invention there is provided an electrically heated aerosol-generating device for heating an aerosol-forming substrate capable to form an inhalable aerosol when heated. The device comprises a receiving cavity for removably receiving at least a portion of an aerosol-generating article including the aerosol-forming substrate to be heated. The device further comprises an electrical heater for heating the aerosol-forming substrate when the article is received in the receiving cavity. In addition, the device comprises a puff detector composing a temperature sensor to detect a temperature change of air flow in the cavity indicative of a user taking a puff. The temperature sensor is arranged outside the receiving cavity at a predefined distance to a test spot on an inner surface of the receiving cavity.

According to the invention it has been recognized that an arrangement of the temperature sensor outside the cavity prevents the sensor from being damaged. At the same time, this arrangement unexpectedly still allows for detecting a user's puff fast enough to enable accurate temperature control, notwithstanding a possible time delay between the occurrence of a temperature drop of the air flow in the cavity and its detectability at the position of the temperature sensor outside the cavity. In particular, the temperature sensor may be configured to detect a temperature change of air flow in the receiving cavity via thermal conduction through a wall member of the device which forms a least a portion of the receiving cavity.

In addition, having the temperature sensor arranged outside the receiving cavity advantageously allows for a simple cavity design. In particular, the cavity does not need to comprise any electrical feedthrough for connecting the sensor. For this reason, the cavity may comprise a closed inner surface. Advantageously, this also allows for shielding other parts of the aerosol-generating device, for example electronic components, from adverse moisture effects within the cavity.

Preferably, the temperature sensor is not in fluid communication with the air flow in the cavity which proves advantageous for the same reasons discussed above. That is, the temperature sensor is not in direct contact with an air flow through the device, in particular through the receiving cavity. In fact, the temperature sensor preferably detects a change of the temperature of the cavity at the test spot which is caused by a change of the temperature of the air flow passing along the inner surface of the cavity at the place of the test spot.

Preferably, the temperature sensor may comprise at least one thermistor. As compared to other types of temperature sensors, for example resistance temperature sensors, thermistors advantageously achieve a greater precision within a limited temperature range. Thermistors also provide a proper temperature response because the resistance of thermistors strongly depends on temperature more so than in standard resistors. In addition, thermistors are well suited for point sensing as being capable to achieve high accuracy in measuring the temperature at a specific point. This is particularly advantageous for measuring the temperature of air flow close to the test spot on the inner surface of the receiving cavity.

Preferably, the thermistor is a negative temperature coefficient (NTC) thermistor. A NTC thermistor comprises a resistance which decreases as temperature rises. NTC thermistors are particularly suitable for monitoring small changes in temperature as those occurring during a user's puff. This is due to the resistance of the material of a NTC thermistor being linearly proportional to the temperature over small changes in temperature.

The thermistor may have the shape of a disc, a rod, a plate, a bead or a cast chip. Such shapes allow for a very compact integration of the thermistor in the aerosol-generating device. For example, the thermistor may be integrated into a wall member of the receiving cavity as will be explained in more detail further below.

The thermistor may comprise at least one of a ceramic material, a polymer or a semiconductor material, for example a sintered metal oxide.

The predefined distance between the temperature sensor and the test spot on the inner surface of the receiving cavity may be in a range of 0.1 millimeter to 2 millimeter, in particular 0.15 millimeter to 1 millimeter, preferably 0.2 millimeter to 0.5 millimeter. Such distances are advantageous with regard to a fast detectability of temperature changes in the receiving cavity.

The receiving cavity may comprise an insertion opening through which an aerosol-generating article may be inserted into the receiving cavity. As used herein, the direction in which the aerosol-generating article is inserted is denoted as insertion direction. Preferably, the insertion direction corresponds to the extension of a length axis, in particular a center axis of the receiving cavity.

Upon insertion into the receiving cavity, at least a portion of the aerosol-generating article may still extend outwards through the insertion opening. The outwardly extending portion preferably is provided for interaction with a user, in particular for being taken into a user's mouth. Hence, during use of the device, the insertion opening may close to the mouth. Accordingly, as used herein, sections close to the insertion opening or close to a user's mouth in use of the device, respectively, are denoted with the prefix "proximal". Sections which are arranged further away are denoted with the prefix "distal".

With regard to this convention, the receiving cavity may be arranged or located in a proximal portion of the aerosol-generating device. The insertion opening may be arranged or located at a proximal end of the aerosol-generating device, in particular at a proximal end of the receiving cavity.

Likewise, the receiving cavity may be formed as a cavity, in particular as an elongate cavity, comprising a distal end portion and a proximal end portion. If present, an insertion opening may be arranged at a proximal end of the receiving cavity. At a distal end, the receiving cavity may comprise a bottom opposite to the insertion opening.

The test spot on the inner surface of the receiving cavity may be located at a distal end portion of the cavity. In particular, the test spot on the inner surface of the receiving cavity may be located at a bottom of the receiving cavity or at a distal end portion of a side wall of the receiving cavity. Such an arrangement is particularly advantageous in a configuration of the device where an air flow through the cavity passes a distal end portion of the cavity. In particular, this applies in cases where the air flow enters an aerosol-generating article, upon being received in the cavity, at a distal end portion of the cavity. These portions are most sensitive to changes in temperature of the air flow when a user takes a puff.

The temperature sensor may be arranged at or at least partially within a wall member of the device which forms a least a portion of the receiving cavity. As described above, the wall member may be a portion of a side wall or a bottom of the receiving cavity. As used herein, the term "arranged at a wall member of the device" in particular means that the temperature sensor is arranged at a surface of the wall member opposite to another surface of the wall member which forms a least a portion of the inner surface of the receiving cavity. In this configuration, a thickness of the wall member at the place, where the temperature sensor is arranged at, preferably corresponds to the predefined distance between the temperature sensor and the test spot on the inner surface of the receiving cavity.

An arrangement of the temperature sensor at least partially within a wall member may be advantageous to reduce the predefined distance between the temperature sensor and the test spot on the inner surface of the receiving cavity and thus to reduce the reaction time in which a temperature change in the receiving cavity is detectable by the temperature sensor. In addition, having the temperature sensor arranged at least partially within a wall member advantageously allows for a compact integration of the temperature sensor in the aerosol-generating device.

In particular with regard to the later configuration, the temperature sensor may be arranged in a recess which is formed in the wall member on a side opposite to the inner surface of the cavity. A wall member comprising a recess on a side opposite to the inner surface of the cavity in which the temperature sensor is at least partially arranged advantageously allows for providing a compact design of the aerosol-generating device.

Preferably, the temperature sensor is attached to a surface of the wall member opposite to the inner surface of the cavity by thermally conductive connecting means, in particular by means of a thermally conductive adhesive or by means of a thermally conductive pad. Preferably, the thermally conductive pad is adhesive. A thermally conductive adhesive or a thermally conductive pad advantageously ensure a good thermal contact between temperature sensor and the wall member and thus with the test spot on the inner surface of the receiving cavity.

In addition, the thermally conductive adhesive or the thermally conductive pad may be deformable. Advantageously, deformability allows for compensating manufacturing tolerances.

The thermally conductive adhesive may be two-part epoxy resin. The thermally conductive adhesive may comprise metals, metal oxides, silica or ceramic microspheres.

In alternative to a thermally conductive adhesive or pad, the thermally conductive connecting means may comprise thermal grease. The thermal grease may comprise a polymerizable liquid matrix and large volume fractions of electrically insulating, but thermally conductive filler. The matrix materials may comprise epoxies, silicones, urethanes, and acrylates. The filler may comprise aluminum oxide, boron nitride, zinc oxide, and increasingly aluminum.

In order to further expedite detectability of a temperature change in the receiving cavity at the position of the temperature sensor outside the cavity, the aerosol-generating device may comprise a thermal conductor that is arranged between the test spot on the inner surface of the receiving cavity and the temperature sensor. Preferably, the thermal conductor forms part of the inner surface of the receiving cavity at least at the position of the test spot. Even more preferably, the thermal conductor extends along the full (predefined) distance between the test spot on the inner surface of the receiving cavity and the temperature sensor. For example, the thermal conductor may comprise a metallic material or a metal oxide material, for example, stainless steel or aluminum or copper.

As used herein, the term "thermally conductive" and "thermal conductor" refers to a material or an element comprising a material which has a thermal conductivity larger than other parts of the device which form at least a portion of the receiving cavity. The thermal conductor may comprise a thermal conductivity of at least 0.5 W/(m·K) [Watt per meter-Kelvin], in particular at least 1 W/(m·K) [Watt per meter-Kelvin], preferably at least 4 W/(m·K) [Watt per meter-Kelvin], even more preferably at least 20 W/(m·K) [Watt per meter-Kelvin], most preferably at least 100 W/(m·K) [Watt per meter-Kelvin], as measured at room temperature (20 degree Celsius).

In addition to the temperature sensor, the puff detector may further comprise an electrical circuitry for converting the output signal of the temperature sensor into a signal indicative of a temperature change of the air flow in the receiving cavity. The electrical circuitry may comprise at least one of a transimpedance amplifier for current-to-voltage conversion, an inverting signal amplifier, a single-ended to-differential converter, an analog-digital converter and a micro-controller.

The aerosol-generating device may further comprise a controller operatively coupled with the puff detector for determining a user's puff based on temperature signals provided by the temperature sensor, in particular based on a signal provided by the puff detector which is indicative of a temperature change of air flow in the receiving cavity. The controller may further be configured to control the overall operation of the aerosol-generating device, in particular the heating process. Based on the signal indicative of a temperature change as provided by the puff detector, the controller may be in particular configured to adjust control of the heating process in order to maintain the heating temperature at a certain level when a user takes a puff.

The controller and at least parts of the puff detector may be integral part of an overall electrical circuitry of the aerosol-generating device.

The aerosol-generating device may comprise a power supply, preferably a battery such as a lithium iron phosphate battery. As an alternative, the power supply may be another form of charge storage device such as a capacitor. The power supply may require recharging and may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the heating device.

The aerosol-generating device may comprise at least one air inlet in fluid communication with the receiving cavity. Accordingly, the aerosol-generating system may comprise an air path extending from the at least one air inlet into the receiving cavity, and possibly further through the aerosol-forming substrate within the article and a mouthpiece into a user's mouth.

Preferably, the air inlet is realized at an insertion opening of the receiving cavity used for inserting the article into the cavity. When the article is received in the cavity, air may be drawn into the receiving cavity at the rim of the insertion opening and further through an air flow passage formed between the outer circumference of the aerosol-generating article and at least one or more portions of the inner surface of the receiving cavity.

The receiving cavity may comprise a plurality or protrusions extending in the interior of the receiving cavity. Preferably, the plurality of protrusions are distanced from each other such that an air flow passage is formed in between neighboring protrusions, that is, by the interstices (free space) between neighboring protrusions, In addition, the plurality or protrusions may be configured to contact at least a portion of the aerosol-generating article for retention of the aerosol-generating article in the receiving cavity.

At least one, in particular each of the plurality of protrusions may comprise or may be formed as or may be a rib. Preferably, the one or more ribs extend along a direction of a length axis, in particular a center axis of the receiving cavity. Preferably, the length axis of the receiving cavity corresponds to an insertion direction along which an aerosol-generating article is insertable into the receiving cavity.

The ribs may be symmetrically arranged around the length axis, in particular the center axis. In particular, the ribs may be arranged equally spaced around the length axis, in particular the center axis. Any of these configurations is advantageous with regard to an improved air flow management of the device. As described above, the term "extending along a direction of the length axis, in particular the center axis includes both, an extension parallel to the center axis as well as an extension in the general direction of the center axis, which may be inclined with regard to the center axis (for example, by 2 degree to 5 degree), but still lying in a respective common plane with the center axis. The latter in particular applies to a substantially tapered, for example conical or frustoconical shape of the receiving cavity as mentioned further below.

The one or more ribs may have a substantially triangular cross-sectional shape. Alternatively, one or more ribs may have a substantially rectangular or substantially trapezoid or a substantially semi-oval or a substantially semi-circular cross-sectional shape.

The one or more ribs may comprise a contact surface which preferably is adapted to the shape of a respective portion of the aerosol-generating article which the contact surface gets into contact with upon insertion of the article into the receiving cavity At least one, in particular each of the plurality of protrusions may be chamfered or may comprise at least one chamfer. Preferably, the respective protrusions may be chamfered at a side facing towards an insertion opening of the receiving cavity or may comprise at least one chamfer facing towards an insertion opening of the receiving cavity. Advantageously, this facilitates insertion of the article into the receiving cavity. Likewise, the respective protrusions may be chamfered at a side facing away form an insertion opening of the receiving cavity or may comprise at least one chamfer facing away from an insertion opening of the receiving cavity. Advantageously, this facilitates removal of the article from the receiving cavity.

The aerosol-generating device may comprise one or more end stops arranged within the receiving cavity, in particular at a distal end of the receiving cavity. The one or more end stops preferably are configured to limit an insertion depth of an aerosol-generating article into the receiving cavity. In particular, the one or more end stops may be configured to prevent an aerosol-generating article from abutting the inner surface of the receiving cavity at a distal end of the receiving cavity that is opposite to an insertion opening of the receiving cavity at a proximal end of the receiving cavity. Thus, the one or more end stops advantageously provide free space within a distal portion of the receiving cavity allowing free air flow between a distal end of the receiving cavity and a distal end of an aerosol-generating article when the article is received in the receiving cavity. The one or more end stops may comprise a contact surface which an aerosol-generating article, in particular a distal end of an aerosol-generating article may abut when the article is received in the receiving cavity.

Preferably, the aerosol-generating device may comprise a plurality of separate end stops, for example three end stops, which are arranged within the receiving cavity, in particular at a distal end of the receiving cavity.

The plurality of end stops may be symmetrically arranged around a length axis, in particular a center axis of the receiving cavity. In particular, the plurality of end stops may be arranged equally spaced around the length axis, in particular the center axis of the receiving cavity. As described above, this enables free air flow around the end stops and an article received in the receiving cavity.

The electrical heater of the aerosol-generating device may be an inductive heater. The inductive heater may comprise an induction source including an inductor which is configured to generate an alternating, in particular high-frequency electromagnetic field within the receiving cavity. The alternating, in particular high-frequency electromagnetic field may be in the range between 500 kHz (kilo-Hertz) to 30 MHz (Mega-Hertz), in particular between 5 MHz to 15 MHz, preferably between 5 MHz and 10 MHz. Upon inserting an article into the receiving cavity, the alternating electromagnetic field is used to inductively heat a susceptor which is in thermal contact with or thermal proximity to an aerosol-forming substrate to be heated. The inductor may be arranged such as to surround at least a portion of the receiving cavity or at least a portion of the inner surface of the receiving cavity, respectively. The inductor may be an inductor coil, for example a helical coil, arranged within a side wall of the receiving cavity. The inductor may be arranged such as to surround only a distal portion of the inner surface of the receiving cavity. Likewise, the inductor may be arranged such as to surround at least an intermediate axial portion of the inner surface of the receiving cavity, wherein the intermediate axial portion is located between a distal portion and a proximal portion of the inner surface of the receiving cavity.

Alternatively, the heater may be a resistive heater comprising a resistive heating element. The heating resistive element is configured to heat up when an electrical current is passed therethrough due to an immanent ohm resistance or resistive load of the resistive heating element. For example, the resistive heating element may comprise at least one of a resistive heating wire, a resistive heating track, a resistive heating grid or a resistive heating mesh. In use of the device, the resistive heating element is in thermal contact with or thermal proximity to an aerosol-forming substrate to be heated.

In general, the receiving cavity may have any suitable shape. In particular, the shape of the receiving cavity may correspond to the shape of the aerosol-generating article to be received therein. Preferably, the receiving cavity may have a substantially cylindrical shape or a tapered shape, for an example substantially conical or substantially frustoconical shape.

Likewise, the receiving cavity may have any suitable cross-section as seen in a plane perpendicular to a length axis of the receiving cavity or perpendicular to an insertion direction of the article. In particular, the cross-section of the receiving cavity may correspond to the shape of the aerosol-generating article to be received therein. Preferably, the receiving cavity has a substantially circular cross-section. Alternatively, the receiving cavity may have a substantially elliptical cross-section or a substantially oval cross-section or a substantially square cross-section or a substantially rectangular cross-section or a substantially triangular cross-section or a substantially polygonal cross-section. As used herein, the above mentioned shapes and cross-sections preferably refer a shape or a cross-section of the receiving cavity without considering any protrusions.

The receiving cavity may be formed as a receiving cavity module, in particular as a tubular sleeve, which may be inserted into a main body of the aerosol-generating device. Advantageously, this allows for a modular assembly of the aerosol-generating device.

Alternatively, at least a part of the receiving cavity may be integrally formed with the main body. By providing at least a part of the receiving cavity as a part of the main body the quantity of parts need to build up the aerosol-generating device may be reduced.

The present invention further relates to an aerosol-generating system comprising an aerosol-generating device according to the invention and as described herein. The system further comprises an aerosol-generating article including at least one aerosol-forming substrate to be heated by the device, wherein at least a portion of the article is removably receivable or removably received in the receiving cavity of the device.

The aerosol-generating article may be a consumable, in particular intended for single use. The aerosol-generating article may be a tobacco article. In particular, the article may be a rod-shaped article, preferably a cylindrical rod-shaped article, which may resemble conventional cigarettes.

The article may comprise one or more of the following elements: a first support element, a substrate element, a second support element, a cooling element, and a filter element. Preferably, the aerosol-generating article comprises at least a first support element, a second support element and a substrate element located between the first support element and the second support element.

All of the aforementioned elements may be sequentially arranged along a length axis of the article in the above described order, wherein the first support element preferably is arranged at a distal end of the article and the filter element preferably is arranged at a proximal end of the article. Each of the aforementioned elements may be substantially cylindrical. In particular, all elements may have the same outer cross-sectional shape. In addition, the elements may be circumscribed by an outer wrapper such as to keep the elements together and to maintain the desired cross-sectional shape of the rod-shaped article. Preferably, the wrapper is made of paper.

As used herein, the term "aerosol-forming substrate" relates to a substrate capable of releasing volatile compounds that can form an aerosol when heated. The aerosol-forming substrate may be a solid or a liquid aerosol-forming substrate. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerin and propylene glycol. The aerosol-forming substrate may also comprise other additives and ingredients, such as nicotine or flavoring substances. In particular, liquid aerosol-forming substrate may include water, solvents, ethanol, plant extracts and natural or artificial flavors. The aerosol-forming substrate may also be a paste-like material, a sachet of porous material comprising aerosol-forming substrate, or, for example, loose tobacco mixed with a gelling agent or sticky agent, which could include a common aerosol former such as glycerin, and then is compressed or molded into a plug.

The substrate element preferably comprise the at least one aerosol-forming substrate to be heated. In case the aerosol-generating system is based on induction heating, the substrate element may further comprise a susceptor which is in thermal contact with or thermal proximity to the aerosol-forming substrate. As used herein, the term "susceptor" refers to an element comprising a material that is capable of being inductively heated within an alternating electromagnetic field. This may be the result of at least one of hysteresis losses or eddy currents induced in the susceptor, depending on the electrical and magnetic properties of the susceptor material.

At least one of the first support element and the second support element may comprise a central air passage. Preferably, at least one of the first support element and the second support element may comprise a hollow cellulose acetate tube. Alternatively, the first support element may be used to cover and protect the distal front end of the substrate element.

The aerosol-cooling element is an element having a large surface area and a low resistance to draw, for example 15 mmWG to 20 mmWG. In use, an aerosol formed by volatile compounds released from the substrate element is drawn through the aerosol-cooling element before being transported to the proximal end of the aerosol-generating article.

The filter element preferably serves as a mouthpiece, or as part of a mouthpiece together with the aerosol-cooling element. As used herein, the term "mouthpiece" refers to a portion of the article through which the aerosol exits the aerosol-generating article.

Further features and advantages of the aerosol-generating system and the aerosol-generating article according to the present invention have already been described above with regard to aerosol-generating device and equally apply.

According to the invention there is also provided a method for detecting a user's puff in use of an aerosol-generating device, in particular of an aerosol-generating device according to the present invention and as described herein. The method comprises the steps of:
  acquiring a plurality of temperature signals from a temperature sensor with a predefined detection rate, wherein each of the plurality of temperature signals is indicative of a temperature of air flow in the cavity of the aerosol-generating device;
  applying a noise reduction filtering to the plurality of acquired temperature signals resulting in a plurality of filtered temperature signals;
  sampling the plurality of filtered temperature signals with a predefined sampling rate resulting in a sample of filtered temperature signals;
  calculating a time derivative for the sample of filtered temperature signals resulting in a time derivative of the temperature signals;
  detecting a user's puff by determining a change in the time derivative of the temperature signals.

Advantageously, the step applying a noise reduction filtering to the plurality of acquired temperature signals facilitates an accurate calculation of the time derivative determining and subsequently an accurate determination of a change in the time derivative.

In general, the plurality of acquired temperature signals may be affected by different types of noise, in particular high-level noise and low-level noise. High-level noise is noise having a high amplitude. In contrast, low-level noise is noise having a low amplitude. In an embodiment "high level noise" is the noise that originates from the electromagnetic field (that impacts the temperature sensor), that is, the electromagnetic field present in the device when, for example, an inductive coil is activated, that is, supplied with an alternating current. In an embodiment "low level noise" is the noise present in the system in the absence of an electromagnetic field, that is, when, for example, an inductive coil is not supplied with an alternating current. With regard to this, it has been recognized that the plurality of acquired temperature signals may require the application of different types of filters in order to reduce different types of noise. In particular, it has been recognized that different types of filters may be applied in parallel to the plurality of acquired temperature signals.

Accordingly, the step of applying a noise reduction filtering may comprise applying in parallel a first filter and a second filter to the acquired temperature signals resulting in a first plurality of filtered temperature signals and a second plurality of filtered temperature signals, wherein the first filter is a high-level noise filter and the second filter is a low-level noise filter.

Accordingly, sampling the plurality of filtered temperature signals may comprise sampling the first and the second plurality of filtered temperature signals with a predefined sampling rate resulting in a first sample of filtered temperature signals and a second sample of filtered temperature signals, respectively.

Accordingly, sampling the plurality of filtered temperature signals may comprise calculating a respective time derivative for the first sample of filtered temperature signals and for the second sample of filtered temperature signals resulting in a first time derivative and a second time derivative, respectively, and subsequently generating a combined time derivative, wherein the combined time derivative is given by the corresponding first time derivative for operational times in which the aerosol-generating device is in a low duty cycle state or in power regulation state, and wherein the combined time derivative is given by the corresponding second time derivative for operational times in which the aerosol-generating device is in a high duty cycle state.

Accordingly, detecting a user's puff may comprise detecting a user's puff by determining a change in the combined time derivative.

Here, it is understood that the aerosol-generating device may be in several different states, preferably three states: a low duty cycle state, a power regulation state, and a full duty cycle state. The power regulation state is an operational state where the power is regulated in order to make sure that the susceptor stays on the target temperature. In a low duty cycle state, the aerosol-generating device is in an operational state in which the electrical heater is powered, in particular in a pulsed mode, with a duty cycle of less than 30 percent, in particular at most 25 percent, preferably at most 20 percent, more preferably at most 15 percent. Likewise, in a high duty cycle state, the aerosol-generating device is in an operational state in which the electrical heater is powered, in particular in a pulsed mode, with a duty cycle of at least 30 percent, in particular at least 40 percent, preferably at least 50 percent.

Preferably, the high-level noise filter is one of a low-pass filter or a median filter. Preferably, the low-level noise filter is one of an infinite impulse response filter, a finite impulse response filter, a minimum-maximum filter (min-max filter). In an embodiment a min-max filter is a filter, where the minimum value in a sample is added to the maximum value in a sample, and the sum is divided with 2.

As mentioned above, applying two different types of filters in parallel to the acquired temperature signals allows for optimizing the signal quality with regard to different aspects.

For example, a median-type filter advantageously is used to globally reduce the signal noise. Median filtering is a well-known technique in signal processing and thus do not need to be further discussed in detail here. The main idea of the median filter is to run through the signal entry by entry, replacing each entry with the median of neighboring entries.

In contrast, an infinite impulse response filter is used to smooth signal transitions between different operational times, in particular between operational times in which the electrical heater is powered, that is in an on-state, and operational times in which is the electrical heater is not powered, that is in an off-state. In general, infinite impulse response filters are also well known from signal processing and thus do not need to be further discussed in detail here either.

The step of sampling the plurality of filtered temperature signals, in particular the first and the second plurality of filtered temperature signals, with a predefined sampling rate advantageously enables to reduce the time required for computing and thus to reduce computational resources. For this, the predefined sampling rate is chosen to be smaller than or below the predefined detection rate. Preferably, the predefined sampling rate is a range of 1 per 100 milliseconds to 1 per 50 milliseconds. That is, the sample of filtered temperature signals, in particular the first sample of filtered temperature signals and the second sample of filtered temperature signals, only take into account a respective temperature signal, in particular a respective first and second filtered temperature signal, each 50 milliseconds to each 100 milliseconds.

The predefined detection rate preferably is in a range of 1 per 1 millisecond to 1 per 10 milliseconds. That is, temperature signals are taken by or acquired from the temperature sensor each 1 millisecond to 100 milliseconds.

Calculating a respective time derivative for the sample of filtered temperature signals, in particular the first sample of filtered temperature signals and for the second sample of filtered temperature signals may be realized, for example, by determine the difference quotient between each two consecutive filtered temperature signals of the sample of filtered temperature signals. The difference quotient between two consecutive filtered temperature signals is the quotient of the difference between two consecutive filtered temperature signals by the difference of the time interval between two consecutive filtered temperature signals, Here, the time interval between two consecutive filtered temperature signals is the inverse of the sampling rate. Accordingly, the difference quotient is a measure of the average rate of change of the filtered temperature signals over a time interval corresponding to the inverse of the sampling rate. For large sampling rates, that is for short time intervals between two consecutive filtered temperature signals of the sample of filtered temperature signals, the limit of the difference quotient is thus the instantaneous rate of change.

The step of determining a change in the time derivative, in particular in the combined time derivative preferably includes determining a sign of change of the time derivative, in particular of the combined time derivative.

Preferably, the step of determining a change in the time derivative, in particular in the combined time derivative, includes using a finite-state machine. As used herein, the term "finite-state machine" denotes a model of the aerosol-generating device comprising a fixed set of states which the aerosol-generating device can be in (the device can only be in one state at a time), and including a set of transitions, that is, pre-defined changes from one state to another in response to some external input. Advantageously, the finite-state machine is used to analyze large variations of the combined time derivative in order to extract residual noise and to finally detect a start and an end of a user's puff.

Further features and advantages of the method according to the invention have been described with regard to aerosol-generating device and system and equally apply.

The invention will be further described, by way of example only, with reference to the accompanying drawings, in which.

Figure 1:
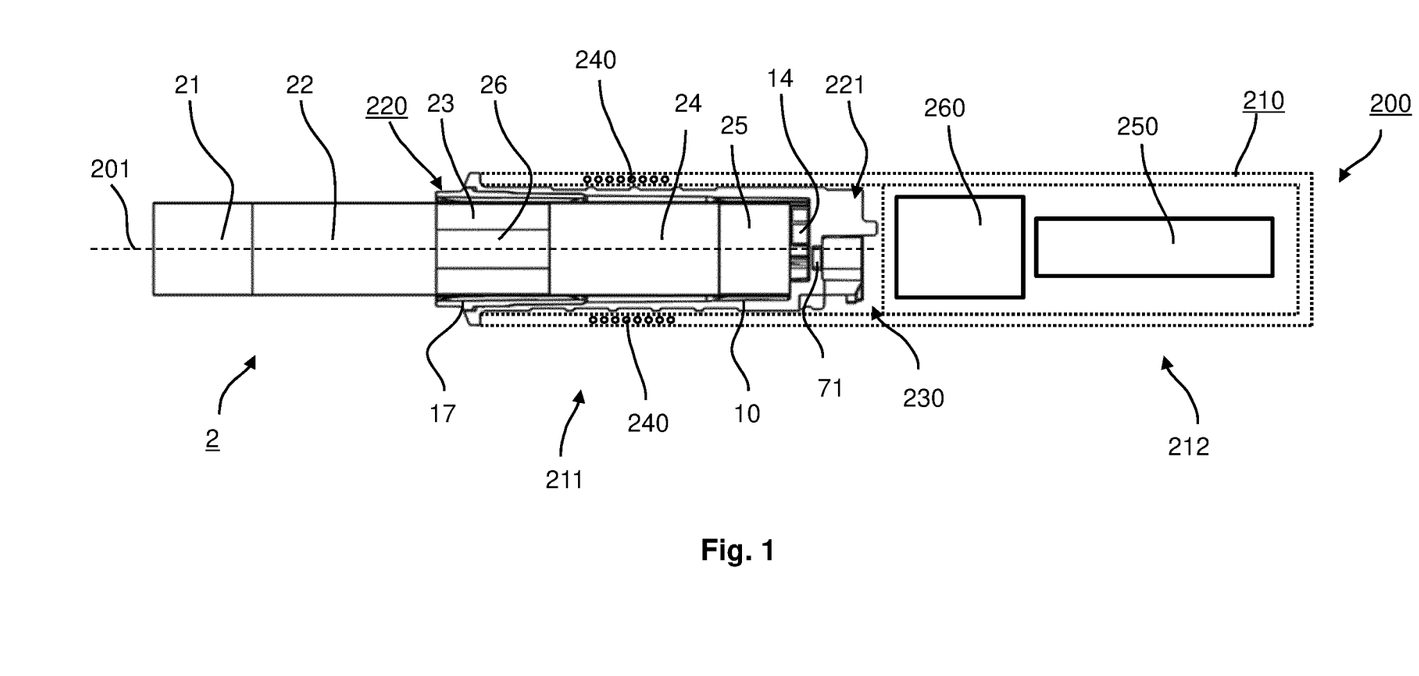
FIG. 1 schematically illustrates an exemplary embodiment of an aerosol-generating device according to the present invention in a sectional view.

FIG. 1 schematically illustrates an exemplary embodiment of an aerosol-generating device 200 according to the present invention. The aerosol-generating device 200 has an elongated shape and comprises a main body 210 and a receiving cavity module 220. The cavity module 220 comprises a receiving cavity 221 for receiving at least a portion of an aerosol-generating article 2. The receiving cavity module 220 is inserted into a recess 230 formed within a proximal portion 211 of the main body 210. Within a distal portion 212, the main body 210 comprises a power source 250 and a controller 260 for powering and controlling operation of the device 200. Together, the aerosol-generating device 200 and the aerosol-generating article 2 form an aerosol-generating system according to the present invention.

Within the proximal portion 211 of the main body 210 that forms the cavity 230, the aerosol-generating device comprises an inductor 240. In the present embodiment, the inductor 240 is a helical coil arranged around the receiving cavity 221. The inductor 240 is part of an inductive heater that is powered and operated by the power source 250 and the controller 260. In use of the device 200, the inductor 240 generates an alternating electromagnetic field within the receiving cavity 221 to inductively heat an aerosol-forming substrate contained in the article 2, when the latter is received in the receiving cavity 221.

Figure 2:
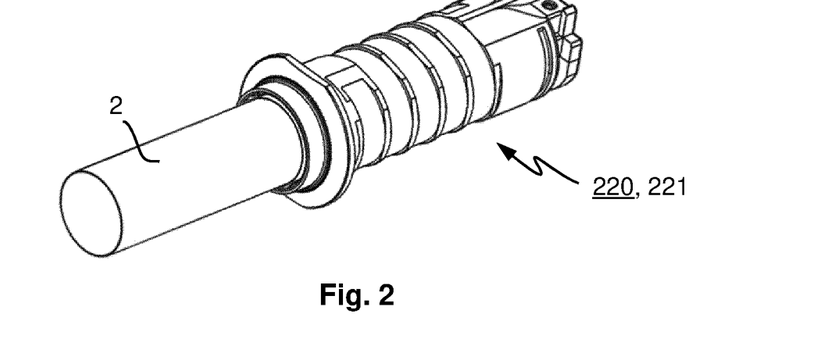
FIG. 2 schematically illustrates a receiving cavity module of the device according to FIG. 1 in a perspective view together with an aerosol-generating article introduced therein.
Figure 3:
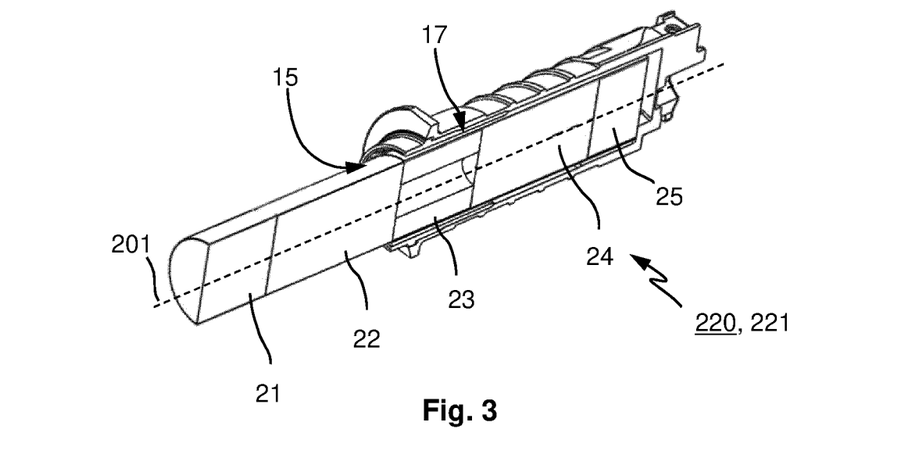
FIG. 3 schematically illustrates the receiving cavity module and the aerosol-generating article according to FIG. 2 in a perspective sectional view.
Figure 4:
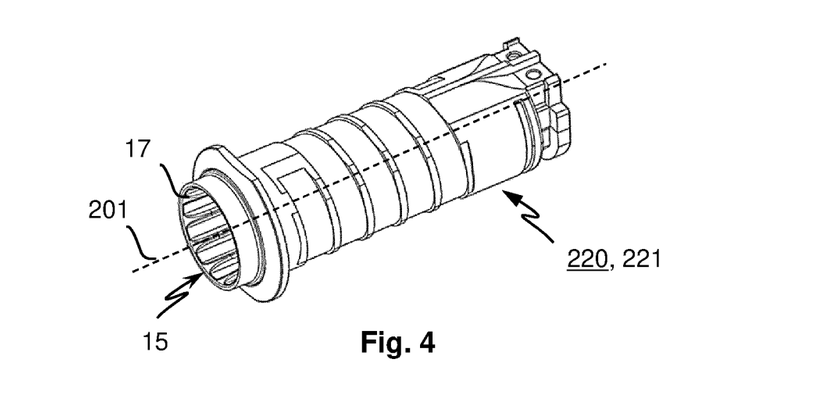
FIG. 4 schematically illustrates the receiving cavity module according to FIG. 2 without the aerosol-generating article.

FIG. 2, FIG. 3 and FIG. 4 show different aspects of the receiving cavity module 220 with and without the aerosol-generating article 2. As can be seen, the receiving cavity module 220 is an elongated sleeve comprising an insertion opening 15 through which the aerosol-generating article 2 may be inserted at least partially into the receiving cavity 221. The insertion direction of the aerosol-generating article 2 substantially extends along a center axis 201 of the receiving cavity 221. The receiving cavity 221 is made of PEEK (polyether ether ketone). The receiving cavity 221 has a substantially cylindrical shape with a substantially circular cross-section having a diameter of about 15 millimeter.

Corresponding to the shape of the receiving cavity 221, the aerosol-generating article 2 has a substantially cylindrical rod-shape. As shown in FIG. 1 and FIG. 3, the article 2 comprises five elements sequentially arranged along a length axis of the article 2: a first support element 25, a substrate element 24, a second support element 23 comprising a central air passage 26, a cooling element 22 and a filter element 21. The first support element 25 is arranged at a distal end of the article 2 and the filter element 21 is arranged at a proximal end of the article 2. Each of the aforementioned elements 21, 22, 23, 24, 25 is substantially cylindrical, all of them having the same outer cross-sectional shape. In addition, the elements are circumscribed by an outer wrapper such as to keep the elements together and to maintain the desired circular cross-sectional shape of the rod-shaped article 2. Preferably, the wrapper is made of paper. The first support element 25 is used to cover and protect the distal front end of the substrate element 24. The substrate element 24 comprise the at least one aerosol-forming substrate to be heated. In addition, the substrate element 24 further comprises a susceptor (not shown) which is in thermal contact with the aerosol-forming substrate. Upon activating the inductor 240, the susceptor is heated due to at least one of eddy currents or hysteresis losses which are induced by the electromagnetic field, depending on the electrical and magnetic properties of the susceptor material. The susceptor heats up until reaching a temperature sufficient to vaporize material from the aerosol-forming substrate. The released material may be entrained in an air flow passing through the article 2 from the first support element 25 through the substrate element 24, the second support element 23 and the cooling element 22 towards the filter element 21. Along this way, the vaporized material cools to form an aerosol before escaping through the filter element 21 at the proximal end of the article 2.

Figure 5:
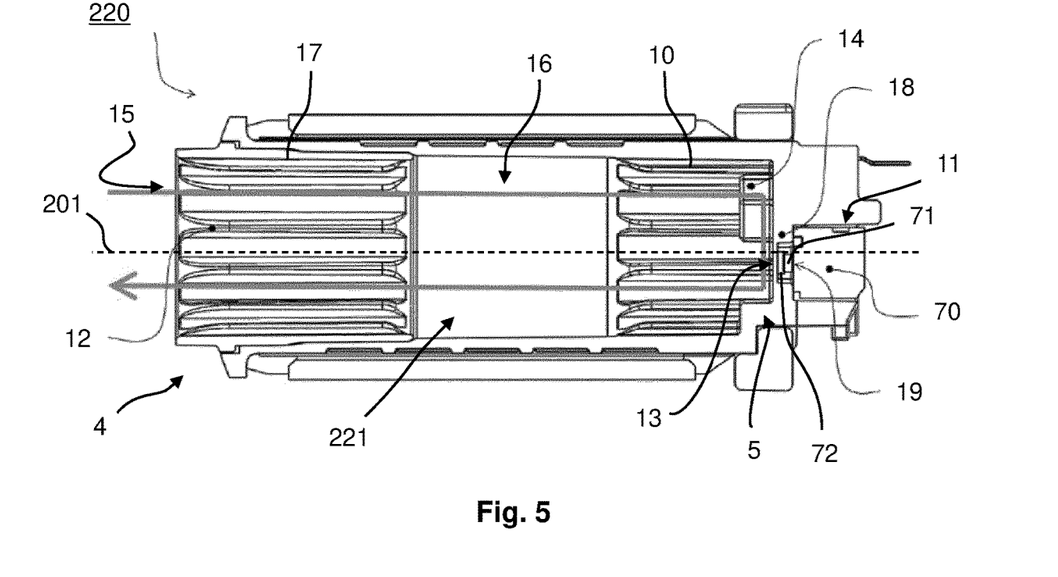
FIG. 5 schematically illustrates a sectional view of the receiving cavity according to FIG. 4 without the aerosol-generating article.

FIG. 5 illustrates further details of the receiving cavity module 220 and the receiving cavity 221, respectively. The receiving cavity 221 comprises an inner surface 16 which comprises a plurality of first and second protrusion 10, 17. As can be seen in FIG. 1 and FIG. 3, when the article 2 is received in the cavity 221, the first support element 25 is in contact with the first protrusions 10 and the second support element 23 is in contact with the second protrusions 17. In contrast, the substrate element 24 is without any contact to the inner surface 16 of the heating cavity 221. Advantageously, this leads to an overall reduction of heat losses due to direct thermal conduction from the aerosol-generating article 2 to the inner surface 16. Furthermore, adverse moistening effects on the article due to condensate formation in the cavity 221 are reduced as well. In the present embodiment, the first and the second protrusions 10, 17 are formed as ribs extending along a direction parallel to the center axis 201. The ribs are symmetrically arranged around the center axis 201 and equally spaced to each other. The spacing between neighboring ribs is in a range of 1.3 millimeter to 1.5 millimeter. With regard to its length extension, each rib is chamfered or comprises a respective chamfer at both ends, that is, at a side facing the insertion opening 15 and at an opposite side facing away from the insertion opening 15. Advantageously, the chamfers facilitate insertion and removal of the aerosol-generating article 2 into and from the receiving cavity 221. Apart from that, each rib has a constant height extension along its length extension. In the present embodiment, the height is in range of 0.4 millimeter to 0.5 millimeter as measured in a radial direction towards the center axis 201.

The first protrusions 10 and the second protrusions 17 fall in line, that is, each of the first protrusions 10 is aligned with a respective one of the second protrusions 17 as seen in a direction parallel to the center axis 201. Due to this, the interstices (free space) in between neighboring first protrusions 10 and in between neighboring second protrusions 17 advantageously form a multi-channel air flow passage 12 which extends form the insertion opening 15 at the proximal end 4 of the receiving cavity 221 to the bottom of the receiving cavity 221 at its distal end 5.

Accordingly, when a negative pressure is applied at the filter element 21 of an aerosol-generating article 2 received in the receiving cavity 221, for example when a user takes a puff, air (see also arrows in FIG. 5) is drawn into the receiving cavity 221 at the rim of the insertion opening 15 and further along the multi-channel air flow passage into the bottom portion at the distal end 4 of the receiving cavity 221. There, the air flow enters the aerosol-generating article 2 through the first support element 25 and further passes through the substrate element 24, the second support element 23, the aerosol cooling element 22 and the filter element 21 where it finally exits the article 2. In the substrate element 24, vaporized material from the aerosol-forming substrate is entrained into the air flow and subsequently cooled down on its further way through the second support element 23, the aerosol cooling element 22 and the filter element 21 such as to form an aerosol.

In order to enable a proper redirection of the air flow into the aerosol-generating article 2 at the bottom portion of the receiving cavity 221, the aerosol-generating device 200 comprises three end stops 14 which are arranged at the distal end 5 of the receiving cavity 221. The end stops 14 are configured to limit the insertion depth of the article 2 into the receiving cavity 221 and, thus, to prevent the article 2 from abutting the bottom surface of the receiving cavity 221. This is shown in FIG. 1.

As mentioned further above, proper puff detecting is important to ensure an accurate control of the heating process. For this, the aerosol-generating device according to the present embodiment comprises a puff detector which comprises a temperature sensor 71 to detect a temperature change of air flow in the receiving cavity indicative of a user taking a puff. As can be seen in FIG. 5, the temperature sensor 71 is arranged outside the receiving cavity 221 at a predefined distance to a test spot 13 on the inner surface of the receiving cavity 221. In the present embodiment, the test spot 13 is located at distal end portion of the cavity 221, opposite to the insertion opening 15. At this position, the air flow through the receiving cavity 221 is already pre-heated due to having passed along the outer circumference of the heated substrate element 24 of the aerosol-generating article 2. Advantageously, this facilities measurement of a temperature change of the air when a user takes a puff.

In the present embodiment, the temperature sensor 71 is a thermistor, in particular a negative temperature coefficient (NTC) thermistor. Thermistors prove particularly advantageous for measuring small changes in temperature.

As can be further seen in FIG. 5, the temperature sensor 71 is arranged within a wall member 18 which forms a bottom portion of the receiving cavity 221. For receiving the temperature sensor 71, the wall member comprises a recess 19 on a side opposite to the inner surface 16 of the cavity 221 in which the temperature sensor 71 is arranged in.

The predefined distance between the temperature sensor 71 and the test spot 13 on the inner surface 16 of the receiving cavity 221 may be in a range of 0.1 millimeter to 2 millimeter, in particular 0.15 millimeter to 1 millimeter, preferably 0.2 millimeter to 0.5 millimeter. Such distances are advantageous with regard to a fast detectability of temperature changes in the receiving cavity 221.

The temperature sensor 71 is attached to a surface of the recess 19 in the wall member 18 opposite to the inner surface of the cavity by means of a thermally conductive pad 72 which ensures good thermal contact with the wall member 18 and thus good thermal conduction between the test spot 13 and the temperature sensor 71. In the present embodiment, the thermal pad 72 is a thermally conductive adhesive which is deformable. Advantageously, deformability allows for compensating manufacturing tolerances.

Figure 6:
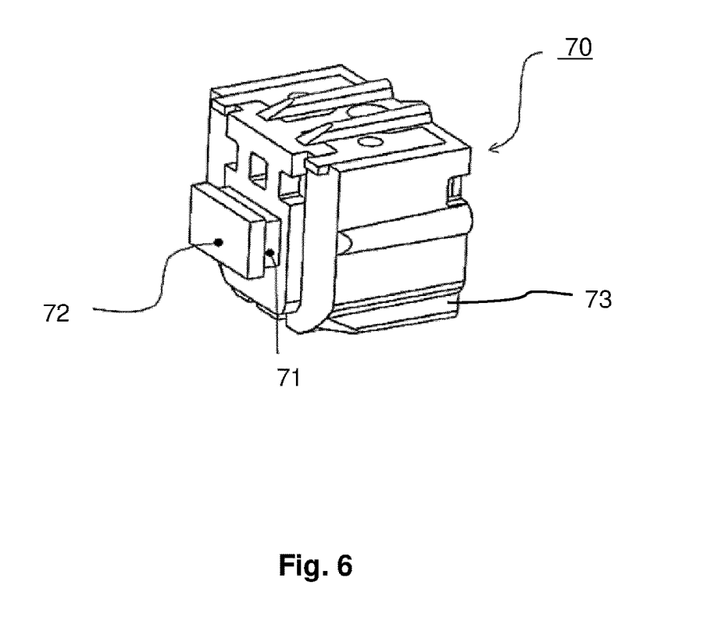
FIG. 6 schematically illustrates a sensing unit as used in the aerosol-generating device according to FIG. 1.

The temperature sensor 71 and the thermal pad 72 are part of a sensing unit 70. Details of the sensing unit 70 are shown in FIG. 6. The sensing unit 70 comprises a support body 73 which the temperature sensor 71 and the thermal pad 72 are attached to and which serves for mounting the sensing unit 70 to the receiving cavity module 220. As shown in FIG. 5, the receiving cavity module 220 comprise a plug-in recess 11 which is located at a bottom portion of the receiving cavity module 220 and which is configured to receive the sensing unit 70. For securely retained the sensing unit 70 in the plug-in recess 11, the support body 73 may comprise one or more snap fits which engage with corresponding snap-fits in the plug-in recess 11 upon insertion of the sensing unit 70 into the plug-in recess 11.

The sensing unit 70 further comprises electrical connector elements to operatively connect the temperature sensor 71 with an electrical circuitry of the puff detector (not shown) for converting the output signal of the temperature sensor 71 into a signal indicative of a temperature, in particular a temperature change of air flow in the receiving cavity 221. The electrical circuitry of the puff detector may be integral part of the controller 26. Based on the signal indicative of a temperature change as provided by the puff detector, the controller 260 may adjust control of the heating process in order to maintain the heating temperature of the substrate in the article 2 at a certain level when a user takes a puff.

Figure 7:
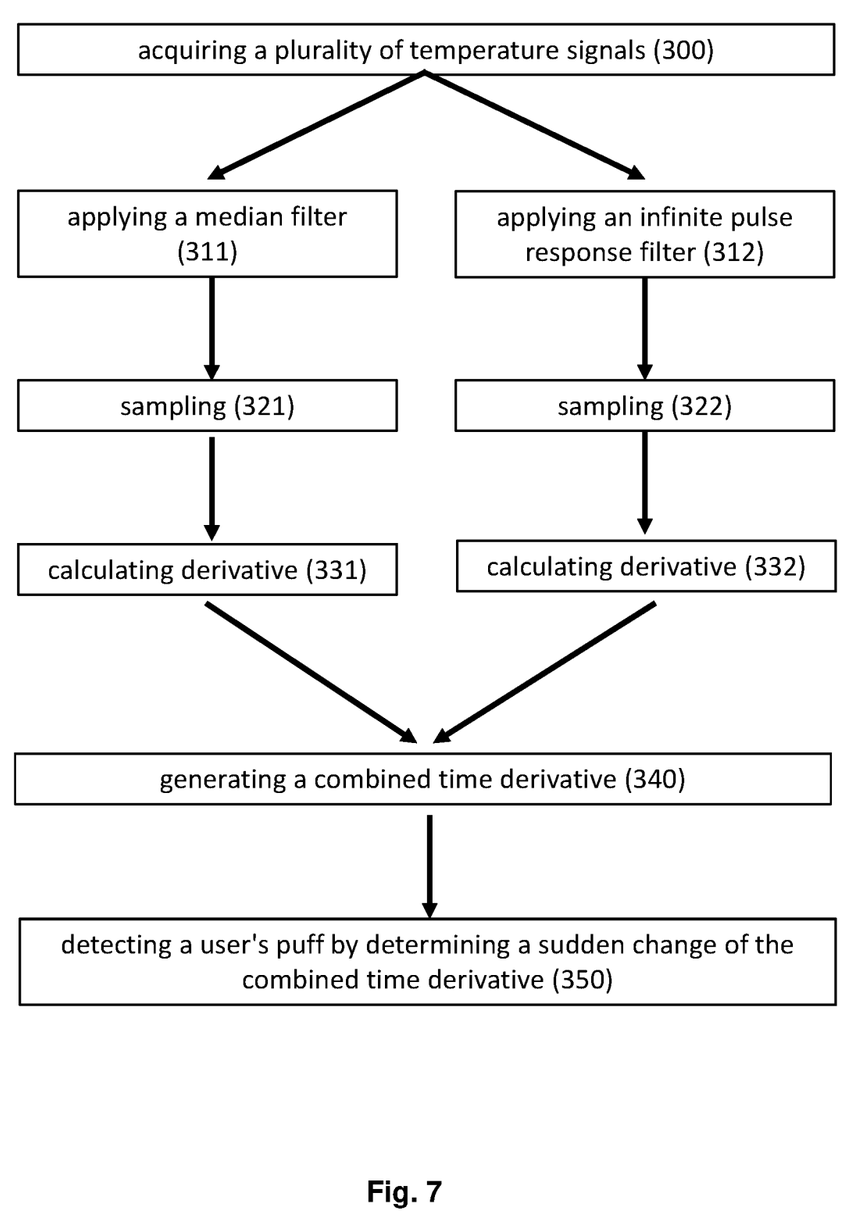
FIG. 7 schematically illustrates an exemplary embodiment of a method for detecting a user's puff according to the present invention.

FIG. 7 schematically illustrates an exemplary embodiment of a method for detecting a user's puff in use of an aerosol-generating device, in particular of an aerosol-generating device according to the present invention and as shown in FIG. 1. As a first step shown at 300, the method comprises acquiring a plurality of temperature signals from a temperature sensor, in particular the temperature sensor 71 of the device 200. Each one of the plurality of temperature signals is indicative of a temperature of air flow in the cavity 221 of the aerosol-generating 200 device. The temperature signals are acquired with a predefined detection rate which may be in a range of 1 per 1 millisecond to 1 per 10 milliseconds, in particular in a range of 1 per 2 milliseconds to 1 per 5 milliseconds.

Next, as shown at 311 and 312, the method according to the present embodiment comprises applying a first filter and a second filter to the acquired temperature signals in parallel. Parallel filtering results in a first plurality of filtered temperature signals and a second plurality of filtered temperature signals. In the present embodiment, the first filter is a median-type filter used to reduce the signal noise. In contrast, the second filter is an infinite impulse response filter used to smooth signal transitions between operational times in which the electrical heater is powered, that is in an on-state, and operational times in which is the electrical heater is not powered, that is in an off-sate.

Afterwards, as shown at 321 and 322, the first and the second plurality of filtered temperature signals are sampled with a predefined sampling rate resulting in a first sample of filtered temperature signals and a second sample of filtered temperature signals, respectively. Advantageously, sampling is used to reduce the time required for computing and thus to reduce computational resources. Preferably, the predefined sampling rate is a range of 1 per 100 milliseconds to 1 per 50 milliseconds.

Next, as shown at 331 and 332, the method comprises the step of calculating a respective time derivative for each of the first sample of filtered temperature signals and for the second sample of filtered temperature signals. Accordingly, steps 331 and 332 result in a first time derivative and a second time derivative. This step may be realized, for example, by determining the difference quotient between each two consecutive filtered temperature signals for each of the first and second sample of filtered temperature signals.

Subsequently, as shown at 340, the method comprises the step of generating a combined time derivative. For operational times in which the aerosol-generating device is in a low duty cycle state or in a power regulation state, the combined time derivative is given by the corresponding first time derivative. In contrast, for operational times in which the aerosol-generating device is in a high duty cycle state the combined time derivative is given by the corresponding second time derivative.

Finally as shown at 350, the method comprises the step of detecting a user's puff by determining a sudden change of the combined time derivative. This step may include determining a sign of change of the combined time derivative. For this, the combined time derivative is to be analyzed, in particular with regard to large variations. Preferably, analyzing the combined time derivative may include using a finite-state machine, in particular to extract residual noise and to finally detect a start and an end of a user's puff.

The invention claimed is:

1. An electrically heatable aerosol-generating device for heating an aerosol-forming substrate to form an inhalable aerosol when heated, the aerosol-generating device comprising:
   a receiving cavity configured to removably receive at least a portion of an aerosol-generating article including the aerosol-forming substrate;
   an electrical heater configured to heat the aerosol-forming substrate when the article is received in the receiving cavity; and
   a puff detector comprising a temperature sensor configured to detect a temperature change of air flow in the receiving cavity indicative of a user taking a puff, wherein the temperature sensor is arranged outside the receiving cavity at a predefined distance to a test spot on an inner surface of the receiving cavity and is further configured to detect a change of the temperature of the receiving cavity at the test spot that is caused by a change of the temperature of the air flow passing along the inner surface of the receiving cavity at a place of the test spot when the user takes the puff.

2. The aerosol-generating device according to claim 1, wherein the temperature sensor is not in fluid communication with the air flow in the receiving cavity.

3. The aerosol-generating device according to claim 1, wherein the temperature sensor comprises at least one thermistor.

4. The aerosol-generating device according to claim 1, wherein the predefined distance between the temperature sensor and the test spot is in a range of 0.1 millimeter to 2 millimeter.

5. The aerosol-generating device according to claim 1, wherein the test spot is located at distal end portion of the receiving cavity.

6. The aerosol-generating device according to claim 1, wherein the temperature sensor is arranged at or at least partially within a wall member of the aerosol-generating device, which forms a least a portion of the receiving cavity.

7. The aerosol-generating device according to claim 6, wherein the wall member comprises a recess on a side opposite to the inner surface of the receiving cavity in which the temperature sensor is at least partially arranged.

8. The aerosol-generating device according to claim 6, wherein the temperature sensor is attached to a surface of the wall member opposite to the inner surface of the receiving cavity by means of a thermally conductive pad.

9. The aerosol-generating device according to claim 1, further comprising a thermal conductor arranged between the test spot on the inner surface of the receiving cavity and the temperature sensor.

10. The aerosol-generating device according to claim 1, further comprising a controller operatively coupled with the detector and configured to determine a user's puff based on temperature signals provided by the temperature sensor.

11. A method for detecting a user's puff in an aerosol-generating device according to claim 1, the method comprising the steps of:
- acquiring a plurality of temperature signals from a temperature sensor with a predefined detection rate, wherein each of the plurality of temperature signals is indicative of a temperature of air flow in the receiving cavity of the aerosol-generating device;
- applying a noise reduction filtering to the plurality of acquired temperature signals resulting in a plurality of filtered temperature signals;
- sampling the plurality of filtered temperature signals with a predefined sampling rate resulting in a sample of filtered temperature signals;
- calculating a time derivative for the sample of filtered temperature signals resulting in a time derivative of the temperature signals; and
- detecting the user's puff by determining a change in the time derivative of the temperature signals.

12. The method according to claim 11,
wherein applying a noise reduction filtering comprises applying in parallel a first filter and a second filter to the acquired temperature signals resulting in a first plurality of filtered temperature signals and a second plurality of filtered temperature signals, the first filter being a high-level noise filter and the second filter being a low-level noise filter,
wherein the sampling the plurality of filtered temperature signals comprises sampling the first plurality of filtered temperature signals and the second plurality of filtered temperature signals with a predefined sampling rate resulting in a first sample of filtered temperature signals and a second sample of filtered temperature signals, respectively,
wherein the calculating the time derivative for the sample of filtered temperature signals further comprises calculating a respective time derivative for the first sample of filtered temperature signals and for the second sample of filtered temperature signals resulting in a first time derivative and a second time derivative, respectively, and subsequently generating a combined time derivative, the combined time derivative being given by the corresponding first time derivative for operational times in which the aerosol-generating device is in a low duty cycle state or in power regulation state, and the combined time derivative being given by the corresponding second time derivative for operational times in which the aerosol-generating device is in a high duty cycle state, and
wherein the detecting the user's puff comprises detecting the user's puff by determining a change in the combined time derivative.

13. The method according to claim 12,
wherein the high-level noise filter is one of a low-pass filter or a median filter, and
wherein the low-level noise filter is one of an infinite impulse response filter, a finite impulse response filter, a min-max filter.

14. The method according to claim 11,
wherein the predefined detection rate is in a range of 1 per 1 millisecond to 1 per 10 milliseconds, and
wherein the predefined sampling rate is in a range of 1 per 100 milliseconds to 1 per 50 milliseconds.

15. The method according to claim 11, wherein the determining a change in the time derivative or in the combined time derivative includes using a finite-state machine.

* * * * *